(12) United States Patent
Giaquinta et al.

(10) Patent No.: US 11,541,368 B2
(45) Date of Patent: Jan. 3, 2023

(54) PARALLEL REACTOR SYSTEMS AND METHODS FOR PREPARING MATERIALS

(71) Applicant: UNCHAINED LABS, Pleasanton, CA (US)

(72) Inventors: Daniel Giaquinta, Saratoga, CA (US); Robert S. Busacca, San Francisco, CA (US); Robert K. Rosen, Lafayette, CA (US); John F. Varni, Los Gatos, CA (US); Jeffrey C. Yoder, San Jose, CA (US)

(73) Assignee: UNCHAINED LABS, Pleasanton, CA (US)

( * ) Notice: Subject to any disclaimer, the term of this patent is extended or adjusted under 35 U.S.C. 154(b) by 994 days.

(21) Appl. No.: 16/221,221

(22) Filed: Dec. 14, 2018

(65) Prior Publication Data

US 2019/0118155 A1 Apr. 25, 2019

Related U.S. Application Data

(62) Division of application No. 14/388,401, filed as application No. PCT/US2013/033861 on Mar. 26, 2013, now Pat. No. 10,195,581.

(Continued)

(51) Int. Cl.
*B01J 19/00* (2006.01)
*C40B 60/12* (2006.01)
(Continued)

(52) U.S. Cl.
CPC ....... *B01J 19/0053* (2013.01); *B01F 35/1452* (2022.01); *B01F 35/188* (2022.01);
(Continued)

(58) Field of Classification Search
CPC .... B01J 2219/00308; B01J 2219/00335; B01J 2219/00337; B01J 2219/00376; B01J 2219/00423; B01J 2219/00477; B01J 2219/00481; B01J 2219/00495; B01J 2219/00585; B01J 2219/00736;
(Continued)

(56) References Cited

U.S. PATENT DOCUMENTS 3,757,981 A 9/1973 Harris, Sr. et al.
5,431,067 A 7/1995 Anderson et al.
(Continued)

FOREIGN PATENT DOCUMENTS

DE 29719919 U1 4/1999
WO WO-2013/148669 A1 10/2013
WO WO-2014/178897 A1 11/2014

OTHER PUBLICATIONS

Final Office Action dated Jul. 7, 2017, for U.S. Appl. No. 14/888,021, filed Oct. 29, 2015, 6 pages.
(Continued)

*Primary Examiner* — Smita S Patel
(74) *Attorney, Agent, or Firm* — Cooley LLP

(57) ABSTRACT

Parallel reactor systems for synthesizing materials are disclosed. The reactor systems may include at least two reaction vessels and may be suitable for synthesizing materials produced from corrosive reagents, for example, Ziegler-Natta catalysts. Antechambers may be provided above the reaction vessels to help purge vapors produced by the corrosive reagents. Methods for preparing materials by use of such parallel reactor systems are also disclosed.

8 Claims, 15 Drawing Sheets

Related U.S. Application Data

(60) Provisional application No. 61/615,666, filed on Mar. 26, 2012.

(51) Int. Cl.

| | | |
|---|---|---|
| *C40B 60/14* | (2006.01) | |
| *B01F 35/00* | (2022.01) | |
| *B01F 35/10* | (2022.01) | |
| *B01F 35/71* | (2022.01) | |
| *B01J 27/138* | (2006.01) | |
| *B01F 101/00* | (2022.01) | |

(52) U.S. Cl.
CPC ...... *B01F 35/189* (2022.01); *B01F 35/71805* (2022.01); *B01J 19/0046* (2013.01); *B01J 27/138* (2013.01); *C40B 60/12* (2013.01); *C40B 60/14* (2013.01); *B01F 2101/2204* (2022.01); *B01J 2219/00308* (2013.01); *B01J 2219/00335* (2013.01); *B01J 2219/00337* (2013.01); *B01J 2219/00376* (2013.01); *B01J 2219/00423* (2013.01); *B01J 2219/00477* (2013.01); *B01J 2219/00481* (2013.01); *B01J 2219/00495* (2013.01); *B01J 2219/00585* (2013.01); *B01J 2219/00736* (2013.01); *B01J 2219/00738* (2013.01); *B01J 2219/00761* (2013.01)

(58) Field of Classification Search
CPC .... B01J 2219/00738; B01J 2219/00761; B01J 19/0053; B01J 19/0046; B01J 19/00; B01J 27/138; B01F 35/71805; B01F 35/188; B01F 35/189; B01F 35/1452; B01F 15/0026; B01F 15/00987; B01F 15/00025; B01F 15/00993; B01F 15/00; B01F 15/02; B01F 2101/2204; C40B 60/12; C40B 60/14; C40B 60/60
See application file for complete search history.

(56) References Cited

U.S. PATENT DOCUMENTS

| | | |
|---|---|---|
| 6,045,755 A | 4/2000 | Lebl et al. |
| 6,455,315 B1 | 9/2002 | Baszczynski et al. |
| 6,455,316 B1 | 9/2002 | Turner et al. |
| 6,524,995 B2 | 2/2003 | Spaether et al. |
| 6,730,753 B2 | 5/2004 | Fottinger et al. |
| 6,800,581 B2 | 10/2004 | Ledford et al. |
| 6,818,584 B2 | 11/2004 | Garoff et al. |
| 7,381,779 B2 | 6/2008 | Campbell, Jr. et al. |
| 7,393,806 B2 | 7/2008 | Bradley et al. |
| 7,465,775 B2 | 12/2008 | Vestberg et al. |
| 7,666,810 B2 | 2/2010 | Wang |
| 7,687,426 B2 | 3/2010 | Bradley et al. |
| 9,915,591 B2 | 3/2018 | Lambert et al. |
| 10,195,581 B2 | 2/2019 | Busacca et al. |
| 2001/0016631 A1 | 8/2001 | Freitag et al. |
| 2002/0106813 A1 | 8/2002 | Smith et al. |
| 2003/0152489 A1 | 8/2003 | Gueller et al. |
| 2003/0211016 A1 | 11/2003 | Dales et al. |
| 2007/0066772 A1 | 3/2007 | Foettinger et al. |
| 2007/0224641 A1 | 9/2007 | Campbell |
| 2008/0286171 A1 | 11/2008 | Diamond et al. |
| 2009/0292089 A1 | 11/2009 | Vaananen et al. |

OTHER PUBLICATIONS

International Search Report dated Jan. 31, 2014, for PCT Application No. PCT/US2013/060333, filed on Sep. 18, 2013, 4 pages.
International Search Report dated Aug. 6, 2013, for PCT Application No. PCT/US2013/033861, filed on Mar. 26, 2013, 3 pages.
Non-Final Office Action dated Dec. 29, 2016, for U.S. Appl. No. 14/888,021, filed Oct. 29, 2015, 6 pages.
Non-Final Office Action dated Oct. 19, 2016, for U.S. Appl. No. 14/388,401, filed Sep. 26, 2014, 9 pages.
Notice of Allowance dated Oct. 25, 2017, for U.S. Appl. No. 14/888,021, filed Oct. 29, 2015, 8 pages.
Notice of Allowance dated Oct. 30, 2018, for U.S. Appl. No. 14/388,401, filed Sep. 26, 2014, 8 pages.
Written Opinion of the International Searching Authority dated Jan. 31, 2014, for PCT Application No. PCT/US2013/060333, filed on Sep. 18, 2013, 7 pages.
Written Opinion of the International Searching Authority dated Aug. 6, 2013, for PCT Application No. PCT/US2013/033861, filed on Mar. 26, 2013, 6 pages.

PARALLEL REACTOR SYSTEMS AND METHODS FOR PREPARING MATERIALS

CROSS-REFERENCE TO RELATED APPLICATIONS

This application is a divisional of U.S. application Ser. No. 14/388,401, filed on Sep. 26, 2014, which is a national stage application of PCT/US2013/033861 under 35 U.S.C. § 371, filed on Mar. 26, 2013, which claims the benefit of U.S. Provisional Application No. 61/615,666, filed on Mar. 26, 2012, the disclosures of which are incorporated herein by reference in their entirety.

FIELD OF THE DISCLOSURE

The field of the disclosure relates to parallel reactor systems for synthesizing materials (e.g., catalysts) and, in particular embodiments, for synthesizing materials produced from corrosive reagents. The field of the disclosure also relates to methods for preparing materials by use of such parallel reactor systems.

BACKGROUND

Research and development programs directed at discovery of materials use high-throughput screening tools to evaluate multiple different candidate materials and/or process conditions to reduce the costs and time associated with the identification of promising candidate materials and/or process conditions. Various high-throughput parallel reactor systems have been developed to evaluate multiple candidate materials and/or process conditions by conducting multiple reactions in parallel (i.e., during the same or overlapping time periods).

A continuing need exists for parallel reactor systems that are capable of processing corrosive components such as components used in Ziegler-Natta catalyst synthesis and for methods for preparing materials by use of such parallel reactor systems.

SUMMARY

One aspect of the present disclosure is directed to a parallel reactor system. The system includes a reactor array with at least two reaction vessels. A dispensing system has a needle for dispensing material into the reaction vessels. An antechamber is disposed above each reaction vessel. The system includes an antechamber sealing member for forming a seal between the needle and the antechamber upon lowering of the needle into the reaction chamber.

Another aspect of the present disclosure is directed to a method for preparing a material in one or more reaction vessels of a parallel reactor system. The reactor system includes a reactor array with at least two reaction vessels, antechambers disposed above each reaction vessel, antechamber sealing members, a valve disposed between each antechamber and each reaction vessel and an automated dispensing system for dispensing material into the reaction vessels. The dispensing system includes an injection needle having a tip. The injection needle is lowered into an antechamber to form a substantially fluid-tight seal between the antechamber sealing member and the injection needle. The injection needle is lowered into the reaction chamber and material is dispensed into the reaction vessel. The injection needle is raised to position the tip of the injection needle in the antechamber. The valve is closed after the tip of the injection needle is positioned in the antechamber. Vapor is purged from the antechamber after the valve is closed. The injection needle is withdrawn from the antechamber.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
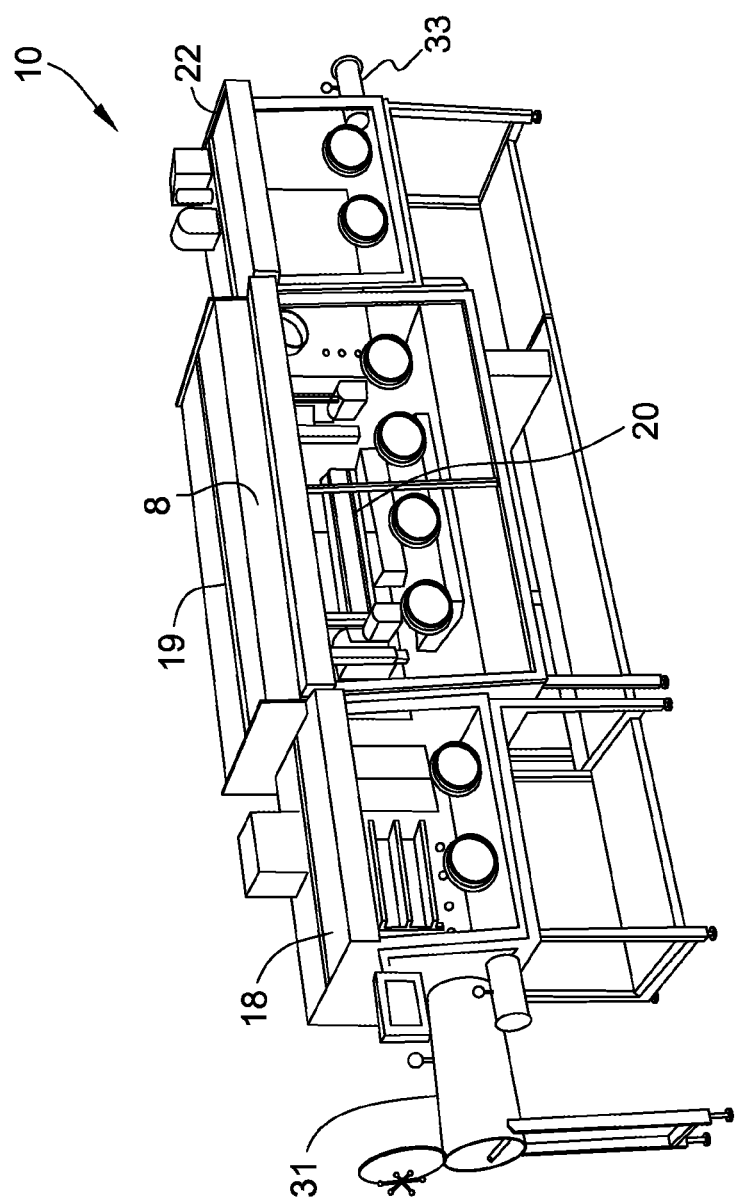
FIG. 1 is a perspective view of a reactor system inside an inert atmosphere glove box.

Referring now to FIG. 1, one embodiment of an automated parallel reactor system is generally designated as 10. The parallel reactor system 10 (also referred to herein simply as "reactor system") includes reactor components such as a parallel reactor array 20 within a housing 8 which is commonly referred to in the art as an "inert atmosphere glove box." The housing 8 of this embodiment is substantially air-tight relative to the surrounding ambient. A gas that is inert to the reactants (e.g., nitrogen or argon) may be introduced into the parallel reactor system to insulate the reactants from ambient compounds such as water vapor or air (particularly oxygen). The inert gas may be continuously introduced into an inlet and continuously withdrawn through an outlet (not shown). The housing 8 of this embodiment is pressurized to prevent ambient gases from entering the housing. Inert gas may be treated to remove potential contaminants (water vapor and/or oxygen) by, for example, treating the gases in a scrubbing device.

The reactor system 10 has three sections—a first section 18, a second section (also referred to herein as "main chamber") 19 and a third section 22. The second section 19 of the housing 8 encloses most reactor system components including the reactor arrays, reagents, robotic arms and the like. The first section 18 and third section 22 provide additional working space for the user and may hold ancillary components. The first section 18 and third section 22 may contain reactor components such as trays and individual containers of reagents, reactor components such as liner vials (i.e., test tubes) and impellers. Such components may be added or removed by use of antechambers 31, 33 which are capable of being isolated from the first section 18 and third section 22. Components may then be added to the antechamber (or removed from the antechamber if components are being removed from the system 10) by purging the antechambers 31, 33 with inert gas (i.e., at least one cycle of vacuum and flushing with inert gas) and the pressure equivocated with the first and third sections 18, 22 of the reactor system. The antechambers 31, 33 may then be opened to the second and third sections 18, 22 for adding material to the reaction system 10. The reactor system 10 may have less than three sections and, in some embodiments, has only one section that contains all reactor system components (i.e., the first section 18 and/or third section 22 are optional).

Introducing inert gases into and out of the housing 8 may allow the amount of water vapor in the system 10 to be reduced to less than about 10 ppm or even to less than about 1 ppm. Use of the inert gas may also allow the amount of oxygen in the system to be reduced to less than about 10 ppm or even less than about 1 ppm. However, the reactor system may include more or less water vapor and oxygen without departing from the scope of the present disclosure. Oxygen and water concentrations in the inert gas may be measured and, as in some embodiments, are measured on a semi-continuous or continuous basis.

Figure 2:
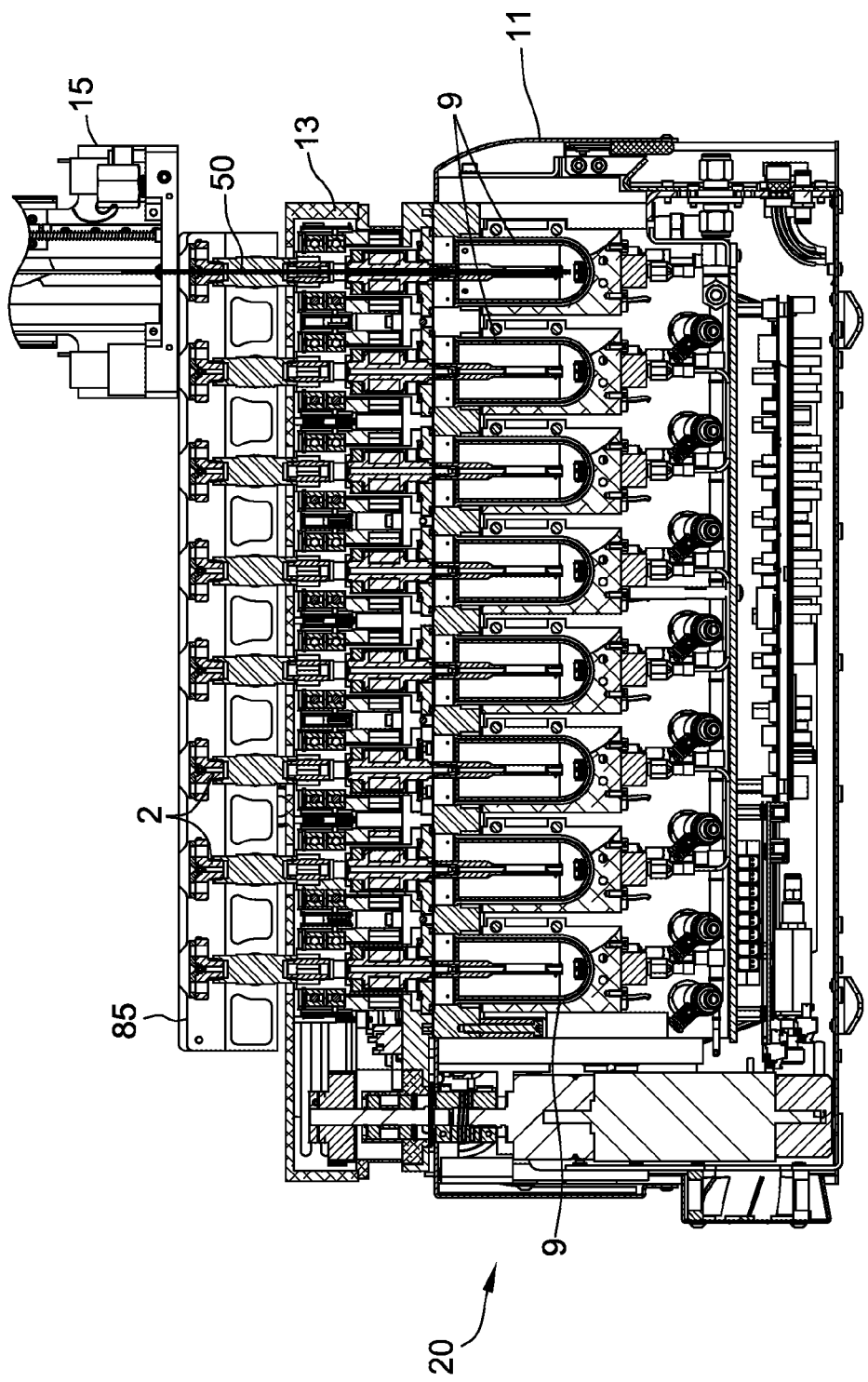
FIG. 2 is a front view of a reactor array and dispensing system.

Referring now to FIG. 2, a reactor array 20 of the reactor system is shown. The reactor array 20 allows for automated control (and, optionally, individual control) of temperature, pressure and stirring such that material (e.g., catalyst) optimization can be performed. The array 20 may be housed in the main chamber 19 of the housing 8. The reactor array 20 includes a number of reaction vessels 9 within a reaction block 11 and a top plate assembly 13 that seals the reaction vessels.

The array 20 shown in FIG. 2 includes 8 reaction vessels 9 in a 1×8 arrangement. The array 20 may include two reaction vessels 9 or more, such as in other embodiments, about 4 reaction vessels or more, about 8 reaction vessels or more, about 16 reaction vessels or more or even about 48 reaction vessels or more. The reaction vessels may be in any suitable arrangement (e.g., 1×8, 2×4, 4×4, etc.).

While the reaction vessels 9 are generally shown in the Figures as being reaction vials, it should be understood that other vessels (e.g., wells including wells of microtiter plates and the like) may be used without departing from the scope of the present disclosure.

Figure 9:
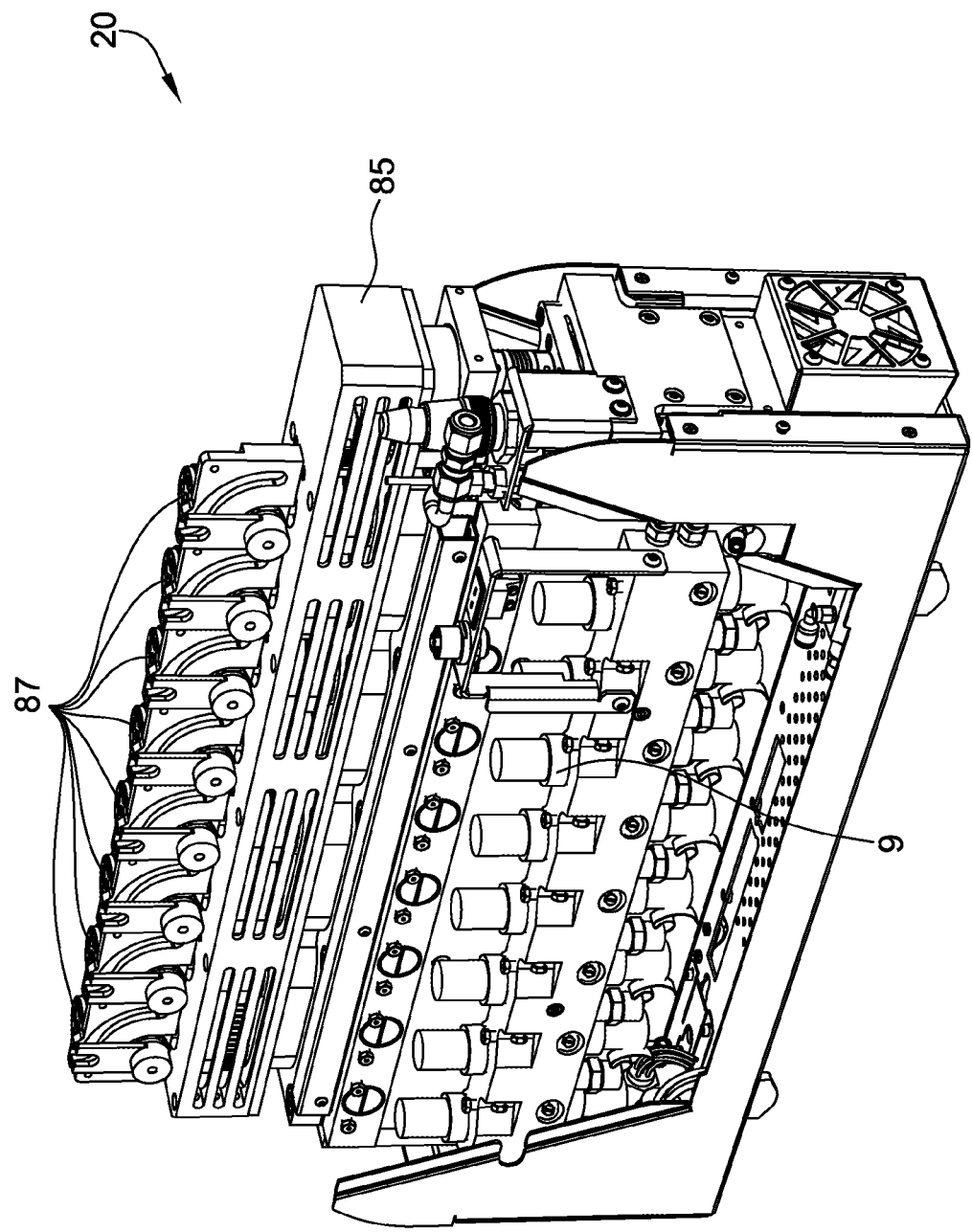
FIG. 9 is a perspective view of a reactor array and injection array.

The reactor array 20 includes an injection array 85 (FIG. 9) that includes access ports 87 and valves that are used to isolate the contents of the reaction vessels 9 during material dispensing and reaction mixture sampling.

Figure 10:
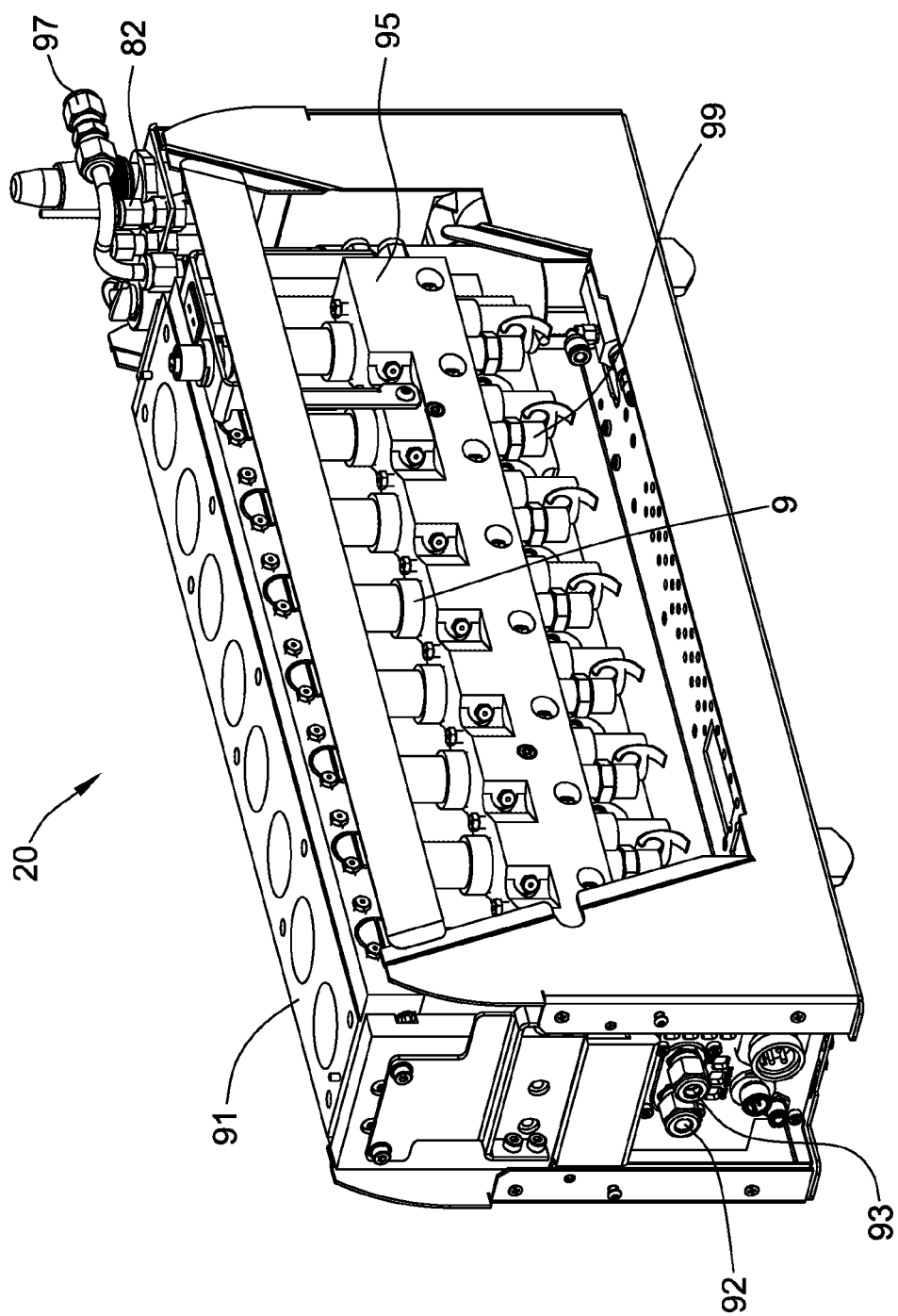
FIG. 10 is a perspective view of the reactor array of FIG. 9.

Referring now to FIG. 10 (the injection array is omitted) the reactor array includes a heated reactor block 91, and a cooling fluid (e.g., gas or liquid) inlet 92 and a cooling fluid outlet 93. In some embodiments, a liquid is used as the cooling fluid for maximum heat transfer. A fluid distribution manifold 95 directs cooling fluid around individual reaction vessels 9 so that the temperature within each reaction vessel may be controlled below ambient temperature. In one embodiment the cooling fluid flux (i.e., the temperature gradient between cooling fluid and the reaction vessel contents) to individual reactors may be controlled for maximum thermal response.

The reactor array 20 includes a process gas inlet (i.e., inert gas inlet) 82 and outlet 97 for automatic introduction of a process gas that pressurizes each reaction vessel 9 and provides the ambient for each vessel. The process gas is also used to automatically introduce an inert gas above the reaction vessels 9 (i.e., in an antechamber as described below) to help insulate the reaction vessels from the rest of the array. Each reaction vessel 9 includes a pressure sensor 99 for measuring and relaying the pressure in each reaction vessel 9.

Figure 11:
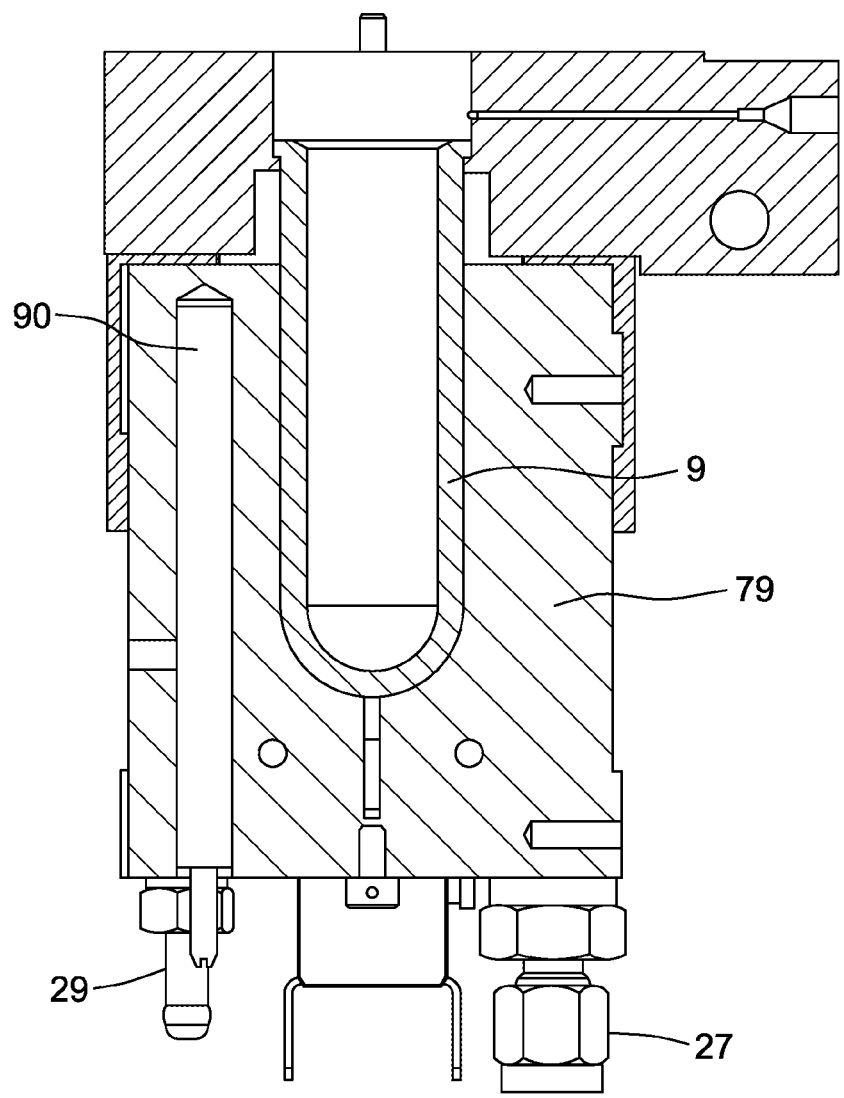
FIG. 11 is a front view of a reaction vessel of the reactor array of FIG. 9.

The array includes cooling channels 30 (FIG. 3) and cooling inlets 27 (FIG. 11) and cooling outlets 29 associated with each reaction vessel 9. The array also includes heated zones 32 (FIG. 3) in thermal communication with each reaction vessel 9 for controlling the temperature of the reaction mixture in the vessel. The heated zones 32 may be heated by use of a cartridge heater 90 (FIG. 11). An external thermocouple (not shown but its position indicated by "79") may be used to indirectly measure the temperature of the reaction contents. The array may include insulation to help regulate the temperature of the reaction mixture.

An automated dispensing system 15 (FIG. 2) is used to dispense material into each reaction vessel 9. The dispensing system 15 is controlled by an arm (not shown) that positions the dispensing system above each reaction vessel 9 for dispensing of material.

Figure 3:
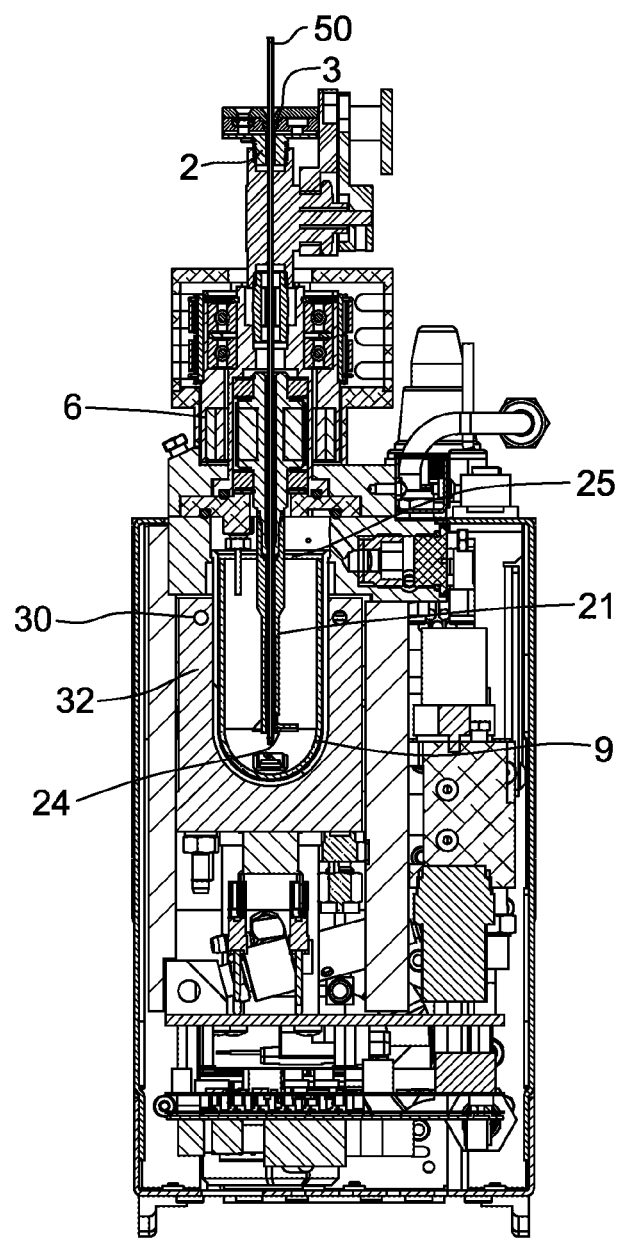
FIGS. 3-4 are front views of a reactor vessel of the array of FIG. 2.

Referring now to FIG. 3, the contents of the reaction vessels 9 may be stirred by use of a magnetic drive 6 which rotates a magnetically coupled stirrer 21. The stirrer 21 may include an impeller 24 to promote stirring of the contents of the reaction vessel 9. The rotation of the magnet 6 causes a corresponding magnet in the reaction vessel to rotate along with a stirrer 21 attached to the magnet thereby stirring the contents of the reaction vessel 9. In some embodiments and as shown in FIG. 3, the stirrer 21 extends from an upper end 25 of the reaction vessel 9 and does not contact the walls of the reaction vessel during use.

Figure 4:
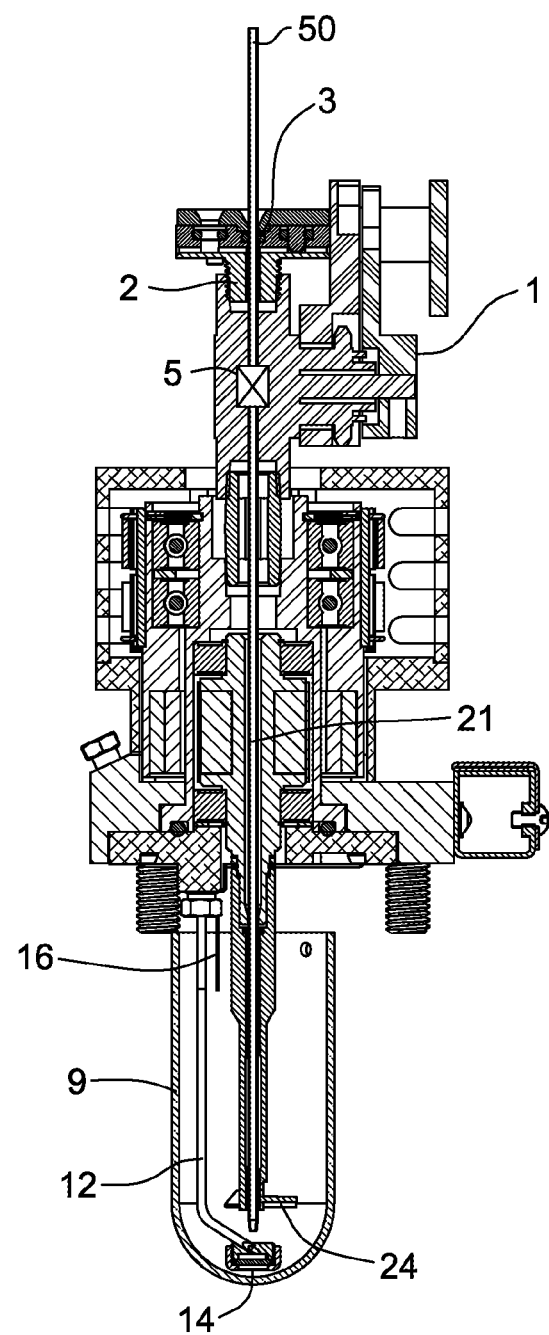
Figure 5:
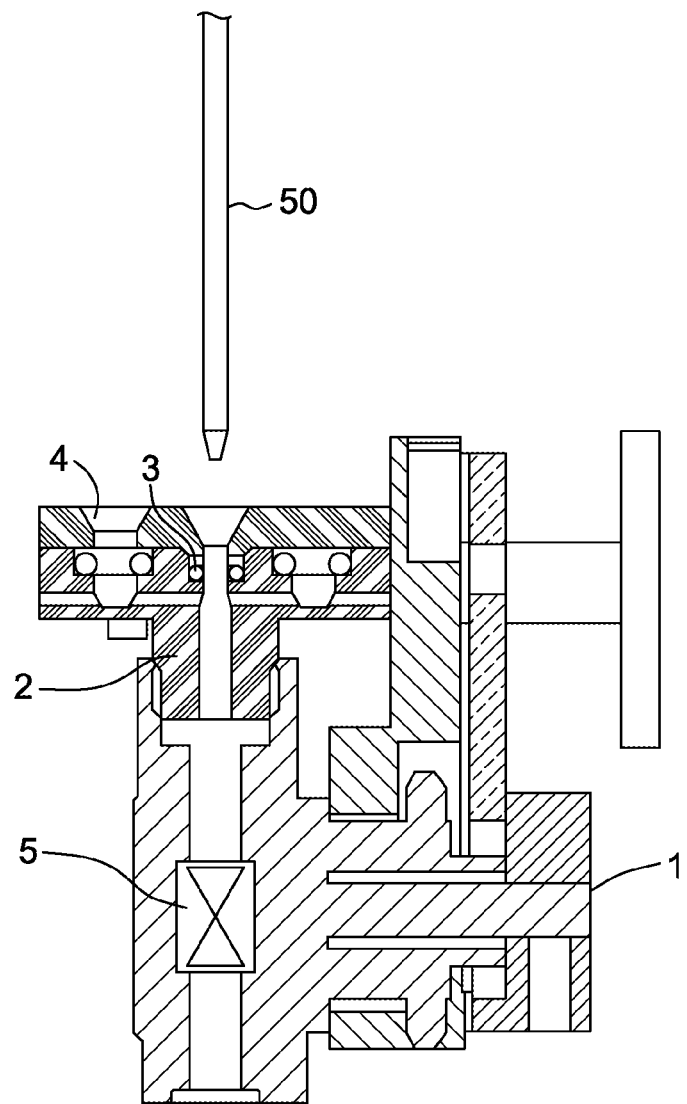
FIG. 5 is a front view of the top plate assembly of the array showing a sealing member, antechamber, and valve prior to insertion of an injection needle.

The reactor array may include a dip tube 12 (FIG. 4) with a frit 14 in each reaction vessel 9 to remove fluids from the reaction vessel 9. The frit 14 acts to filter solids while withdrawing fluid from the vessel 9. The frit 14 may periodically be backwashed to prevent excess solid material from obstructing the frit 14.

A second tube 16 may be used for injection of solvent. In some embodiments, the tube 16 is eliminated and solvent is introduced through the dip tube thereby backwashing the frit 14.

In some embodiments and as shown in FIGS. 3-7, the parallel reactor system includes a sealing member 3 disposed above each reaction vessel 9. The sealing member 3 forms a substantially fluid-tight seal between an injection needle 50 of the dispensing system 15 (FIG. 2).

Figure 8:
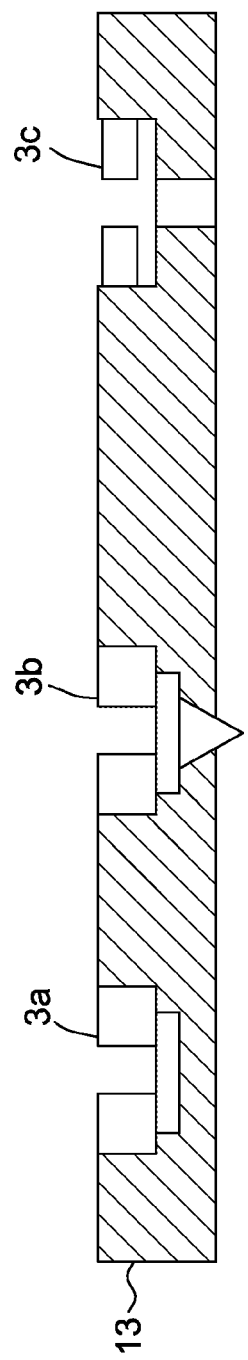
FIG. 8 is a front view of three alternative sealing members for sealing an antechamber.

Suitable alternative sealing members 3 for covering an opening within the top plate assembly 13 above the reaction vessel 9 are shown in FIG. 8. A first embodiment of the sealing member 3 is referenced as 3*a* in FIG. 8. Sealing member 3*a* is a septum. To dispense material into the reaction vessel 9, the injection needle 50 (FIG. 2) is lowered and pierces the septum 3*a*. The septum 3*a* forms a seal around the injection needle and isolates the reaction vessel from the other components of the parallel reactor system. The injection needle continues to be lowered to dispense material as further described below.

A second embodiment of the sealing member 3 is referenced as 3*b* in FIG. 8. The top plate assembly 13 may include duckbill injectors 3*b* that are seated in the openings within the top plate assembly. To dispense material into the reaction vessel 9, the injection needle is lowered and pierces the duckbill injector 3*b*. The duckbill injector 3*b* forms a seal around the injection needle and isolates the reaction vessel from the other components of the parallel reactor system. The injection needle continues to be lowered to dispense material as further described below. Once the fluid pressure is reduced, the injector seals which prevents backflow of fluid.

A third embodiment of the sealing member is referenced as 3*c* in FIG. 8. The top plate assembly 13 may include an o-ring 3*c* seated in the openings within the top plate assembly. To dispense material into the reaction vessel 9, the injection needle is lowered through the o-ring 3*c* thereby forming an air-tight seal with the o-ring. The injection needle continues to be lowered to dispense material as further described below. In another embodiment, the sealing member 3 may be a valve (not shown).

Figure 6:
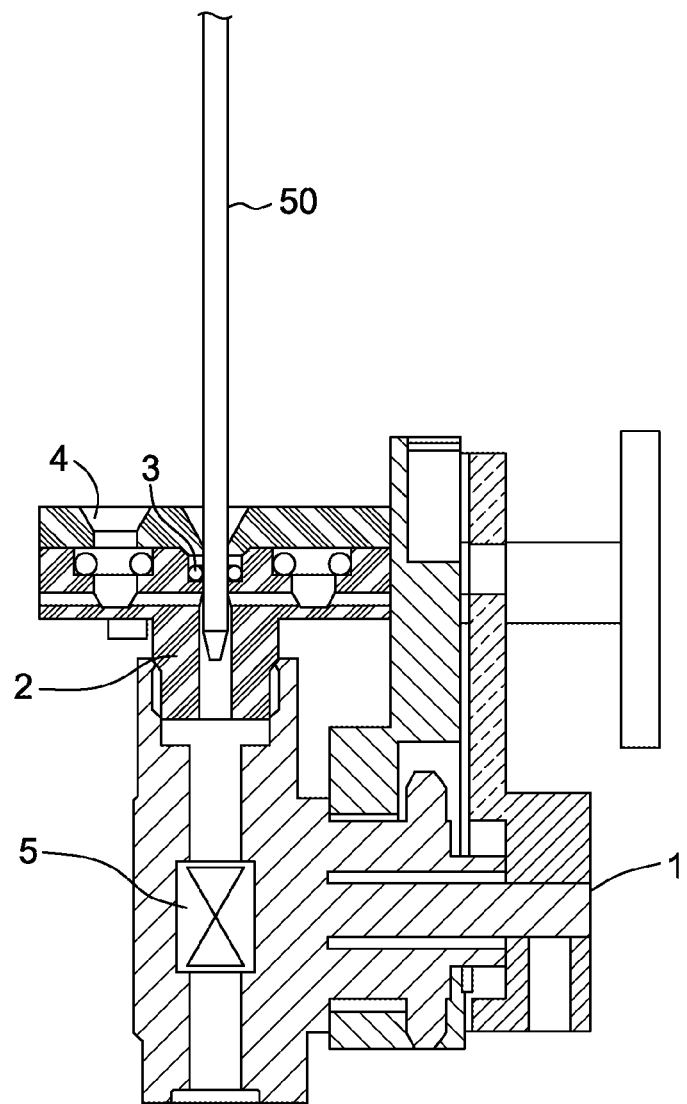
FIG. 6 is a front view of the top plate assembly of the array showing a sealing member, antechamber, and valve upon insertion of the injection needle into the antechamber.
Figure 7:
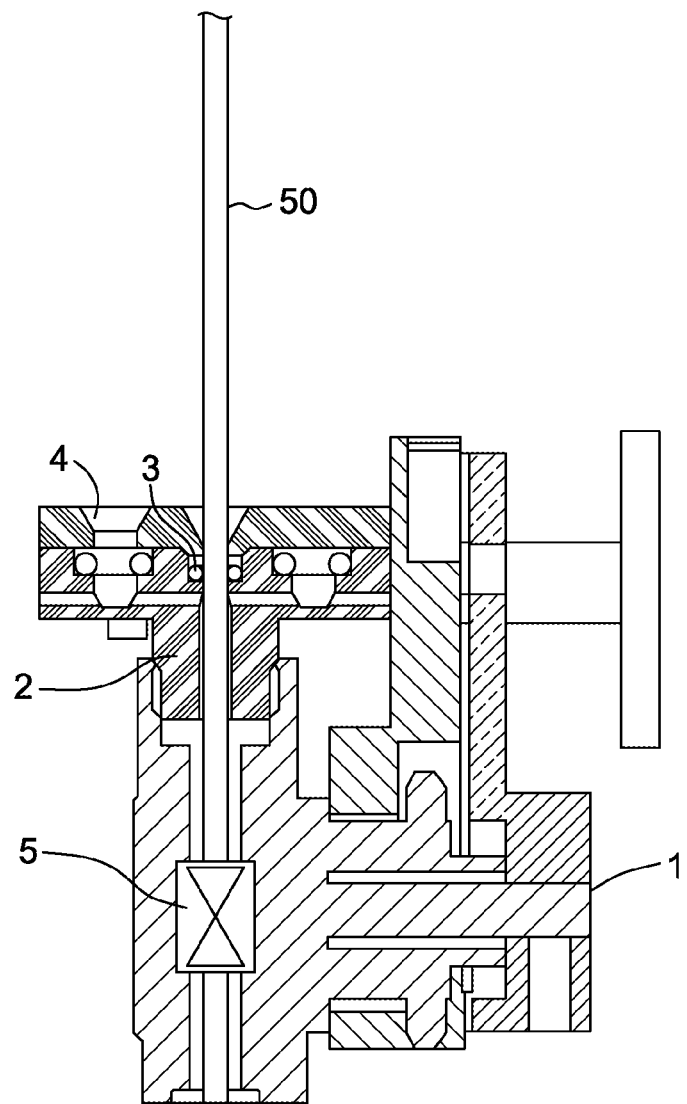
FIG. 7 is a front view of the top plate assembly of the array showing a sealing member, antechamber, and valve after insertion of the injection needle through the open valve.

In addition to the sealing member 3, the top plate assembly 13 may include antechambers 2 (FIGS. 2-7) disposed above each reaction vessel 9. The antechambers 2 include inert gas inlets and venting outlets (not shown) for purging the antechamber. Corrosive gases may enter the antechamber 2 during lowering of the needle 50 into the reaction vessel 9 (FIGS. 6-7). The antechamber 2 allows such gases to be isolated and removed (and treated downstream) thereby preventing such gases from contacting other portions of the parallel reactor system.

In addition to the antechamber 2, the top plate assembly 13 may include a valve 5 (FIGS. 5-7) that isolate the antechamber 2 from the reaction vessel 9 when closed. The valve 5 may be controlled by an actuating mechanism 1. The valve 5 may be closed while the injection needle 50 is lowered to engage the sealing member 3 and to enter the antechamber 2. Inert gas may be introduced into the antechamber 2 and withdrawn (optionally while creating a vacuum) to purge the antechamber of any fluid that is present in the needle. A gas manifold pressure system (not shown) attached to the arm of the dispensing system may seal with a port 4 for applying a vacuum and/or applying an inert gas to the antechamber 2.

After the antechamber 2 is purged, the valve 5 is opened and the needle 50 is lowered toward the reaction chamber 9 (FIG. 7) to dispense material into the reaction chamber. In embodiments in which the reaction vessel 9 is at a pressure other than ambient, the antechamber 2 is pressurized (or a vacuum is applied) to substantially match the pressure of the reaction chamber 9.

After dispensing of material through the injection needle 50 into the reaction vessel, the injection needle is raised until the tip of the injection passes through the valve 5 into the antechamber 2. Valve 5 is then closed and the remaining liquid in the needle is quickly drawn back to behind the first valve 71 of the dispensing system 15 (FIG. 12), e.g., by a pump. The antechamber 2 is then purged with inert gas and brought to ambient pressure to purge any vapor that may be present in the needle 50. The injection needle 50 may then be further raised and removed from the top plate assembly 13.

Figure 12:
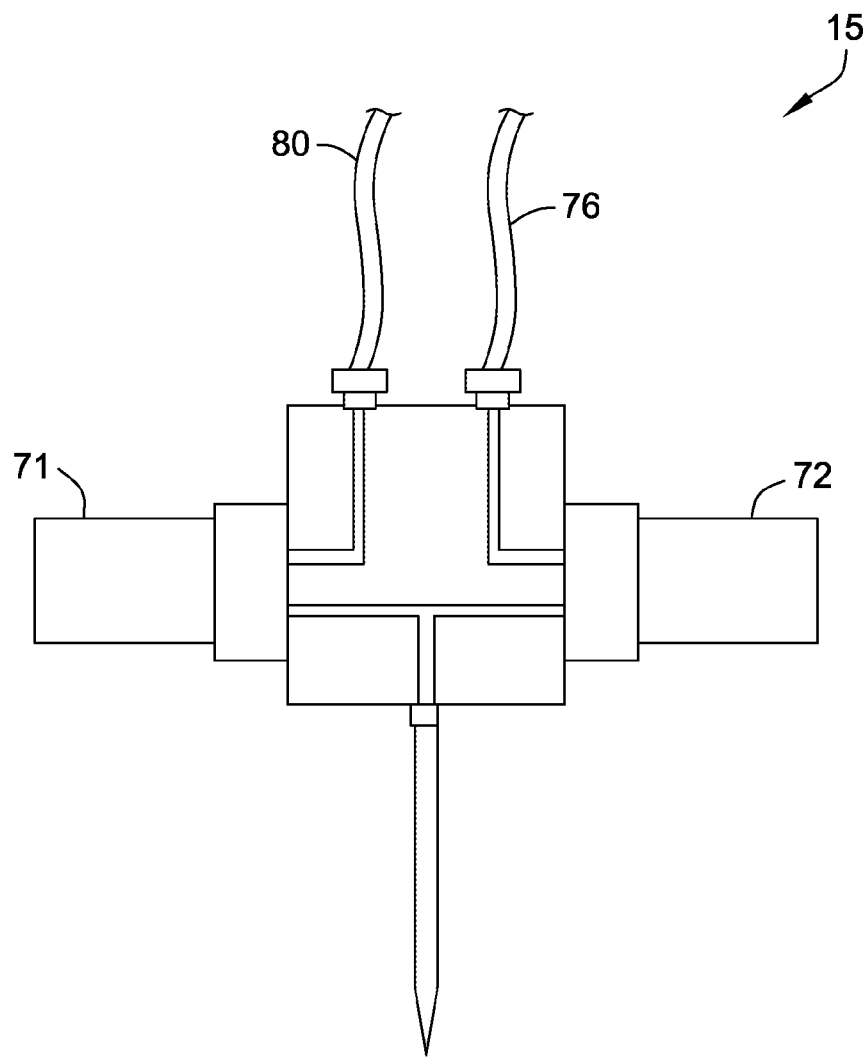
FIG. 12 is a front view of a dispensing system for injecting fluid into the reaction vessels.

Referring now to FIG. 12, an embodiment of a dispensing system 15 for use in dispensing two materials into each reaction vessel is shown. The system 15 includes a first valve 71 used to control flow of a first fluid (e.g., reaction fluid) through a first supply line 80 and a second valve 72 used to control flow of a second fluid (e.g., solvent) through a second supply line 76. The first fluid is generally different than the second fluid. The valves may be electronically or pneumatically actuated. Allowing two fluids to be dispensed by use of one dispensing system reduces cross-contamination (and resulting corrosion) by isolating the corrosive fluid from the surrounding atmosphere and providing a mechanism for the dispensing system to be rinsed by an inert material.

Other embodiments of the dispensing system utilize additional selection style valve(s) beyond those shown in FIG. 12. This allows controlled volumes of different fluids to be contained within a single line and separated by air gaps. In this manner the exact required amount of corrosive fluid can be contained behind the fluid valve described in FIG. 12, followed by an air gap and a non-corrosive solvent type fluid. Upon dispensing, the fluid valve is actuated and enough volume is dispensed to completely expel the corrosive fluid and a small portion of the air gap. After fluid is completely dispensed there is no bulk quantity of the corrosive fluid remaining exposed to the surrounding atmosphere.

Figure 13:
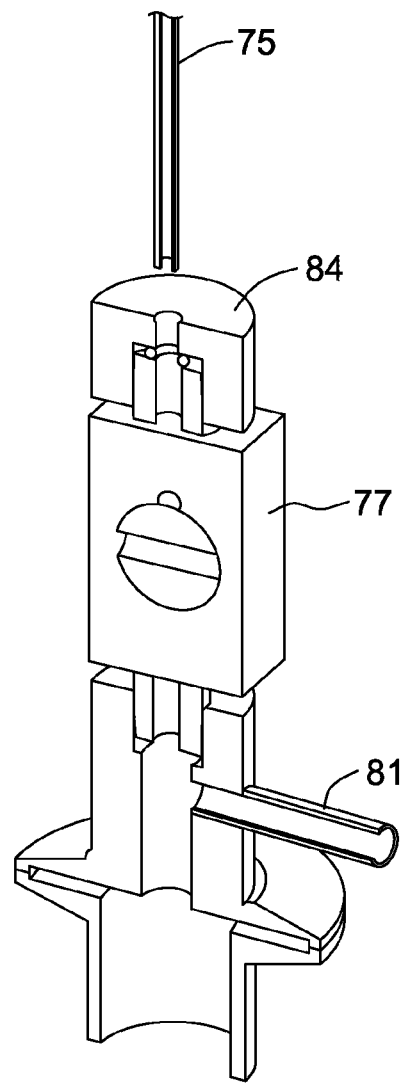
FIG. 13 is a cross-section perspective view of a waste container sealing member prior to insertion of an injection needle.
Figure 14:
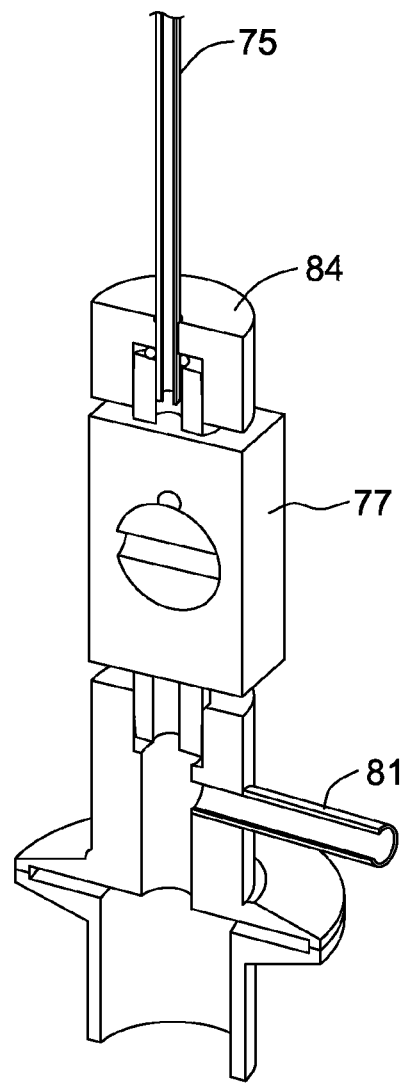
FIG. 14 is a cross-section perspective view of a waste container sealing member after formation of a seal between the injection needle and an o-ring and prior to the valve opening.
Figure 15:
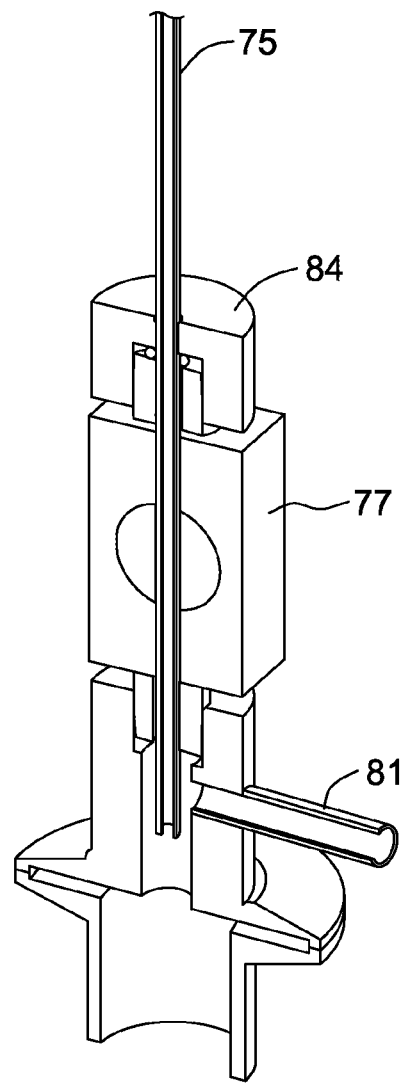
FIG. 15 is a cross-section perspective view of a waste container sealing member after the valve is opened and the injection needle is fully positioned for dispensing waste.

The parallel reactor system 10 (FIG. 1) may include waste containers for disposal of unreacted reagents or reaction by-products and other corrosive materials. In some embodiments and as shown in FIGS. 13-15, each waste container may be connected to a sealing assembly to prevent material from back filling from the waste container. The waste container sealing assembly includes a sealing member 84 and a valve 77. The sealing member 84 may, for example, be an o-ring which conforms to the size and shape of the dispensing needle 75 or the sealing member may be a septum or duck-bill injector as described above in relation to the sealing member 3 (FIG. 8) of the reactor array 20 (FIG. 2). The reactor system may include two or more such waste containers to prevent the mixing of two different waste streams which are capable of reacting strongly when combined. Switching of flow between waste containers may be achieved by means of selector valve (not shown) which may be actuated by software control, consistent with chemistry steps to avoid mixing of incompatible waste streams.

To inject waste into the waste vessel, the waste dispensing needle 75 is placed through the sealing member 84 to form a primary seal. The valve 77 is opened and the needle 75 is lowered past the valve 77. Fluid is injected into the waste vessel and the dispensing needle 75 is removed from the sealing member 84. The valve 77 is closed before the dispensing needle is removed from the sealing member to prevent back-fill of material from the waste-containers.

The sealing system may include a port 81 for introducing inert gas to the waste vessel. An inert purge gas may be continuously fed to the waste vessel to exclude the surrounding atmosphere and prevent unwanted reaction with that atmosphere. The gas may be treated (e.g., in a neutralization bubbler) and vented (not shown). Neutralization bubblers allow visual verification that venting is occurring. The bubbler may include any liquid (e.g., oil) that may neutralize corrosive gases and/or hazardous gases. After treatment, gases may be vented through a hood. In some embodiments, the atmosphere is venting continuously.

In some embodiments, the waste containers are positioned outside of the main chamber 19 (FIG. 1). The lines between the waste containers and the main chamber 19 are a potential ingress path for surrounding atmosphere. One or more check valves and/or solenoid valves may be used to prevent surrounding atmosphere from entering the main chamber 19. Wastes may be removed from the reaction vessels by pressurizing the reaction vessel above the pressure of the waste container (e.g., by use of an inert gas) to cause waste to flow to the waste container and entirely empty into the waste container.

The parallel reactor system 10 (FIG. 1) may include a number of arms for injecting reagent, e.g., automatically injecting reagent, and may include additional reaction vessels, reagent storage and the like. The parallel reactor system may include various supporting elements for securing the components of the system and these supporting elements may be distinct from one another (similar to the housing sections) or may be integrally connected in the system. The system may employ various heating and/or cooling elements for heating and/or cooling the reagents and/or reaction mixtures. Generally these components may be designed and selected in accordance with the principles and standards within the high-throughput parallel processing field. The various components may be linked to a controller (e.g., a microcontroller or computer including computer software) that is configured for automatically operating the parallel reactors, as will be understood by those of skill in the art.

The parallel reactor system 10 described above may be used with reagents that are corrosive, and/or to produce reaction products that are corrosive. The reactor system may be configured to reduce the amount of corrosive material that may escape from reagent storage or from the reaction vessel during or after injecting the corrosive material. For purposes of the present disclosure, the term "corrosive" includes materials that cause oxidation or other weakening of common reactor system components causing the components to need to be replaced prior to their expected useful life. Such corrosive materials include materials that themselves are corrosive and/or that may react with ambient materials such as water vapor or oxygen or may react with other reaction reagents to create a corrosive material.

In some embodiments of the present disclosure, the parallel reactor system 10 is used to produce a solid material in each reaction vessel and, in particular embodiments, is used to produce a heterogeneous catalyst in each reaction vessel. In some embodiments, the parallel reactor system 10 is used to produce a catalyst commonly known in the art as a Ziegler-Natta catalyst in each reaction vessel. Ziegler-Natta catalysts are heterogeneous solid-phase catalysts used to produce polyolefins. Ziegler-Natta catalyst may be prepared by use of titanium chloride (TiCl4) which is a highly corrosive reagent. Preparation may also involve use of aluminum chlorides and other chlorine containing reagents. Without preventative measures, these chlorides may result in corrosive films that form in parallel reactor systems including systems with inert gas insulation (i.e., glove-boxes).

Ziegler-Natta catalysts may be prepared in a series of preparation steps such as:
(a) precursor (e.g., magnesium alkyl) synthesis;
(b) preparation of magnesium chloride ($MgCl_2$) or silica supports from various precursors;
(c) support activation; and
(d) $TiCl_4$ based catalyst synthesis.

It should be noted that the Ziegler-Natta catalyst synthesis steps described above are exemplary and other routes may be used and/or the recited steps may be eliminated and/or additional preparative steps included. The recited steps should not be considered in a limiting sense.

The Ziegler-Natta catalyst may be prepared in accordance with one or more methods known to those of skill in the art including, for example, the methods disclosed in U.S. Pat. Nos. 6,730,753; 6,524,995; 7,381,779; 7,393,806; 7,687,426; 7,465,775; 6,818,584; 7,666,810; 6,800,581 or U.S. Patent Pub. Nos. 2007/0066772 and 2009/0292089, each of which is incorporated herein by reference for all relevant and consistent purposes.

Embodiments of the present disclosure have a number of advantages and capabilities. For example, capabilities include titanation reactions using TiCl4, temperature controlled reactions, stir control to avoid attrition of solids, solid/liquid separation and washing and a controlled inert atmosphere. The proposed synthesis station would allow for catalyst synthesis on at least two different scales: (1) catalyst discovery with increased throughput but process control for groups of reactors and (2) catalyst optimization with moderate throughput and individual process controlled reactors. Use of a stirrer mounted above the reaction vessel enables agitation of reactor vessel contents without the stirrer contacting the walls of the reaction vessel. In contrast, conventional stirrers in similar reactors may result in attrition and breakage of solid phase components in the reaction vessel due to contact of the impeller with the reactor wall. Accordingly, catalyst morphology may be preserved (e.g., such as in testing Ziegler-Natta catalysts). Antechambers in the reactor array allow material from the injection needle to be purged during and/or after materials are dispensed which prevents contamination of the other components of the reactor array which is particularly advantageous when corrosive materials are used.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A method for processing corrosive materials in a parallel reactor system, the parallel reactor system comprising:
   a reactor array comprising at least two reaction vessels;
   a dispensing system having a dispensing needle that dispenses a first corrosive fluid into each of the at least two reaction vessels;
   an antechamber disposed above each of the at least two reaction vessels and comprising a venting outlet that purges vapor produced by the first corrosive fluid from the antechamber;
   an antechamber sealing member associated with each of the at least two reaction vessels; and an actuatable valve between the antechamber and each of the at least two reaction vessels, the method comprising:
lowering the dispensing needle into the antechamber to form a seal between the antechamber sealing member and the dispensing needle;
lowering the dispensing needle into each of the at least two reaction vessels and dispensing the first corrosive fluid into each of the at least two reaction vessels;
raising the dispensing needle to position a tip of the dispensing needle in the antechamber;
isolating the antechamber from each of the at least two reaction vessels by closing the actuatable valve, wherein closing the actuatable valve is controlled by an actuating mechanism;
purging vapor produced by the first corrosive fluid from the antechamber after the actuatable valve is closed; and
withdrawing the dispensing needle from the antechamber.

2. The method of claim 1, further comprising purging the first corrosive fluid from the antechamber after lowering the dispensing needle into the antechamber and prior to lowering the dispensing needle into each of the at least two reaction vessels.

3. The method of claim 1, further comprising dispensing a second fluid into each of the at least two reaction vessels.

4. The method of claim 1, wherein the parallel reactor system further comprises a waste container and a sealing assembly having a sealing member and a valve disposed between the sealing member and the waste container, the method comprising:

forming a seal between the sealing member and the dispensing needle;
opening the valve after the seal has formed between the dispensing needle and the sealing member;
dispensing waste from the dispensing needle into the waste container;
closing the valve after waste has been dispensed into the waste container; and
withdrawing the dispensing needle after the valve has been closed.

5. The method of claim 1, wherein the parallel reactor system forms a Ziegler-Natta catalyst by:
(1) synthesizing a magnesium alkyl precursor;
(2) preparing a magnesium chloride support from the magnesium alkyl precursor;
(3) activating the magnesium chloride support; and
(4) contacting the magnesium chloride support with titanium chloride ($TiCl_4$).

6. The method of claim 1, wherein the parallel reactor system comprises at least two waste containers, the method comprising dispensing a different waste material to each of the at least two waste containers.

7. The method of claim 2, wherein the first corrosive fluid is purged from the antechamber by circulating inert gas through the antechamber.

8. The method of claim 3, wherein the second fluid is corrosive.

* * * * *